(12) United States Patent
Clark (10) Patent No.: US 10,564,444 B2
(45) Date of Patent: Feb. 18, 2020

(54) HEADWEAR DEVICE WITH VISOR FOR EYEGLASSES

(71) Applicant: Robbin Scott Clark, Indianapolis, IN (US)

(72) Inventor: Robbin Scott Clark, Indianapolis, IN (US)

( * ) Notice: Subject to any disclaimer, the term of this patent is extended or adjusted under 35 U.S.C. 154(b) by 0 days.

(21) Appl. No.: 16/040,010

(22) Filed: Jul. 19, 2018

(65) Prior Publication Data

US 2019/0025606 A1    Jan. 24, 2019

Related U.S. Application Data

(60) Provisional application No. 62/534,983, filed on Jul. 20, 2017.

(51) Int. Cl.
*G02C 3/02*    (2006.01)
*A42B 1/06*    (2006.01)

(52) U.S. Cl.
CPC ............... *G02C 3/02* (2013.01); *A42B 1/064* (2013.01)

(58) Field of Classification Search
CPC .............. G02C 3/02; A42B 1/247; A42B 3/22
USPC ........................................................ 2/209.13
See application file for complete search history.

(56) References Cited

U.S. PATENT DOCUMENTS

| | | | |
|---|---|---|---|
| 4,541,125 A | 9/1985 | Phillips | |
| 2006/0152671 A1* | 7/2006 | Risso | A42B 1/247 351/155 |
| 2007/0192933 A1* | 8/2007 | Kam | A42B 1/247 2/171 |
| 2007/0271677 A1* | 11/2007 | Romanski | A42B 1/247 2/171 |
| 2008/0084531 A1* | 4/2008 | Pilarski | A42B 1/247 351/47 |
| 2009/0235437 A1* | 9/2009 | Springer | A42B 3/185 2/422 |
| 2009/0284712 A1* | 11/2009 | Brooks | A42B 1/247 351/155 |
| 2010/0014046 A1* | 1/2010 | Millios | A42B 1/247 351/155 |
| 2010/0231851 A1* | 9/2010 | Anhalt | A42B 1/247 351/155 |
| 2011/0019147 A1* | 1/2011 | Ledford | G02C 3/02 351/155 |
| 2011/0225707 A1* | 9/2011 | Millios | A42B 3/185 2/422 |
| 2011/0247120 A1* | 10/2011 | Knoedler | A42B 1/247 2/10 |
| 2012/0297522 A1* | 11/2012 | Treger | G02C 3/02 2/209.13 |
| 2014/0013480 A1* | 1/2014 | Treger | A42B 1/247 2/10 |
| 2018/0055128 A1* | 3/2018 | Hall, Sr. | A42B 1/247 |

* cited by examiner

*Primary Examiner* — Gloria M Hale
(74) *Attorney, Agent, or Firm* — Maginot, Moore & Beck LLP (57) ABSTRACT

A headwear device is configured for use with eyeglasses. The headwear device includes a visor, a crown, and two temple members extending rearwardly from the visor. The headwear device further includes two clips extending from the two temple members. Each clip includes a cylindrical portion defining an axial recess. The axial recess is designed and dimensioned to receive a temple of the eyeglasses.

20 Claims, 12 Drawing Sheets

HEADWEAR DEVICE WITH VISOR FOR EYEGLASSES

CROSS-REFERENCE TO RELATED APPLICATIONS

This application claims priority to U.S. provisional patent application No. 62/534,983, filed Jul. 20, 2017, the disclosure of which is incorporated herein by reference in its entirety.

FIELD

This document relates to the field of light shades and particularly to headwear devices configured to block sunlight or other bright light from the eyes of a wearer.

BACKGROUND

When an individual is outside or in other bright light situations, it is often desirable for the individual to shield his or her eyes from the bright light. Sunglasses, baseball caps and visors are commonly used to shield eyes from bright lights. However, it is often inconvenient for a user to switch between sunglasses and regular eyeglasses when moving between normal light and bright light environments. Similarly, it is often inconvenient for a user to carry a cap or other relatively large headwear when moving between normal light and bright light environments. While caps and other conventional headwear can be easily donned and removed, some individuals may not want to wear a cap or other conventional headwear because it may mess up the individual's styled hair. Moreover, the way in which caps and other headwear typically fit on the head of the wearer does not shield light in a manner that will best protect a wearer's eyes from bright light.

In view of the foregoing, it would be advantageous to provide a headwear device configured to effectively shield light from the eyes of a wearer in bright light situations. It would also be advantageous if such headwear device were easy to carry and concealable when not in use. Additionally, it would also be advantageous if such headwear device were comfortable to wear and did not result in damage to the wearer's hairstyle. Furthermore, it would be advantageous if such headwear device could be used with conventional eyeglasses in lieu of sunglasses.

SUMMARY

In accordance with one exemplary embodiment of the disclosure, there is provided a headwear device includes a visor configured to clip on to the eyeglasses of a wearer and rest on top of the eyeglasses. The visor is lightweight and configured to rest on the eyeglasses in a manner that prevents bright light from above the visor reaching the eyes of the wearer. Additionally, the configuration of the headwear device prevents the device from interfering with the hairstyle of the wearer.

In another embodiment of the disclosure, there is provided a headwear device including a visor, a first coupling member, and a second coupling member. The first coupling member extends from at least one of two lateral portions of the visor. The second coupling member releasably engages the first coupling member and includes a first surface configured to engage the first coupling member and a second surface configured to receive a temple of the eyeglasses.

In accordance with a further embodiment, a method of shielding a wearer's eyes from light is provided. The method includes arranging eyeglasses on the wearer's head, engaging a second surface of a second coupling member of a headwear device with a temple of the eyeglasses, and releasably engaging the second coupling member with a first coupling member of the headwear device. The eyeglasses include at least one lens and frames, and the frames include a temple. The headwear device includes a visor having two lateral portions, and the first coupling member extends from at least one of the two lateral portions. The second coupling member is configured to releasably engage the first coupling member via a first surface of the second coupling member.

The above described features and advantages, as well as others, will become more readily apparent to those of ordinary skill in the art by reference to the following detailed description and accompanying drawings. While it would be desirable to provide a headwear device that provides one or more of these or other advantageous features, the teachings disclosed herein extend to those embodiments which fall within the scope of any appended claims, regardless of whether they accomplish one or more of the above-mentioned advantages.

DESCRIPTION

With reference to FIGS. 1-5, a headwear device 10 is shown. The headwear device 10 is configured for use with traditional eyeglasses including lenses retained within rims and two temples extending in a posterior direction from the rims. The headwear device 10 includes a crown 20 extending upwardly from a visor 30. Two temple members 40, 42 extend rearwardly from the visor. Two clips 60, 62 extend downwardly from the two temple members 40, 42. Each clip is configured to receive one of the temple members 40, 42 and retain the headwear device 10 on the eyeglasses.

The headwear device 10 is a monolithic component such that the crown 20, visor 30, temple members 40, 42 and clips 60, 62 are provided as a unitary piece with each component connected to another component such that no one component can be removed from another component without destruction of the headwear device 10. Accordingly, the various components of the headwear device may be integrally formed using a molding process, such as injection molding or compression molding. In other embodiments different processes may be used to form the components of the headwear device 10, such as a 3D printing process or other manufacturing process. Any of various materials may be used to form the headwear device 10. In at least one embodiment, the headwear device is comprised of a lightweight polymer material such as polypropylene or other polymers of relatively low density and light weight. In various embodiments the polymer may be provided in any of various forms that offer structural stability yet light weight, such as foam materials, metal materials, cellular materials, or composite materials.

The crown 20 of the headwear device 10 is provided by a front panel that extends in an upward direction from the visor 30. The front panel of the crown is provided by a curved wall with a gradually and continuously curved interior surface and similarly shaped exterior surface. The curved interior surface designed and dimensioned to closely abut the forehead of a majority of adult humans and also span the width of a majority of adult eyeglasses (from a right lateral edge of the rims to a left lateral edge of the rims). Accordingly, the width of the crown 20 from left side to right side is typically between about 3.5 and 6 inches. The height of the crown 20 (as it extends above the visor 30) is relatively low compared to the crown of a traditional cap or visor headwear. For example, the height of the crown 20 may be between about 0.5 and 2 inches extending upward from the visor 30. The height of the crown 20 above the visor 30 varies from end to end, with the shortest height at the center of the crown and gradually increasing on both sides moving toward the lateral edges. The upper lateral edges of the crown 20 are chamfered to provide comfort to the wearer and prevent any sharp edges from engaging the forehead of the wearer. The chamfered edges also reduce the weight of the crown 20 and therefore the overall weight of the headwear device 10 while also further limiting any possible interference with the hair of the wearer.

Figure 1:
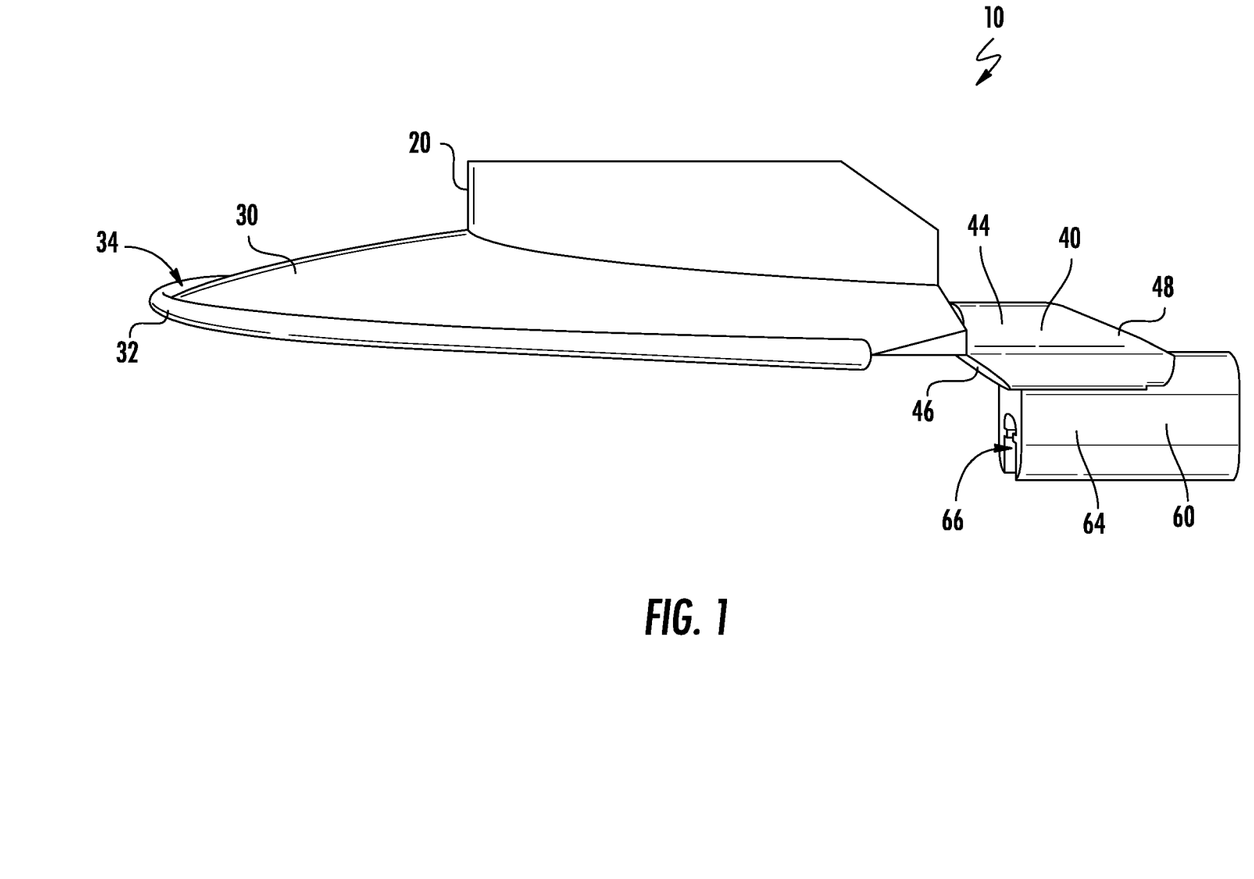
FIG. 1 shows a left side perspective view of an embodiment of a headwear device with a visor.
Figure 2:
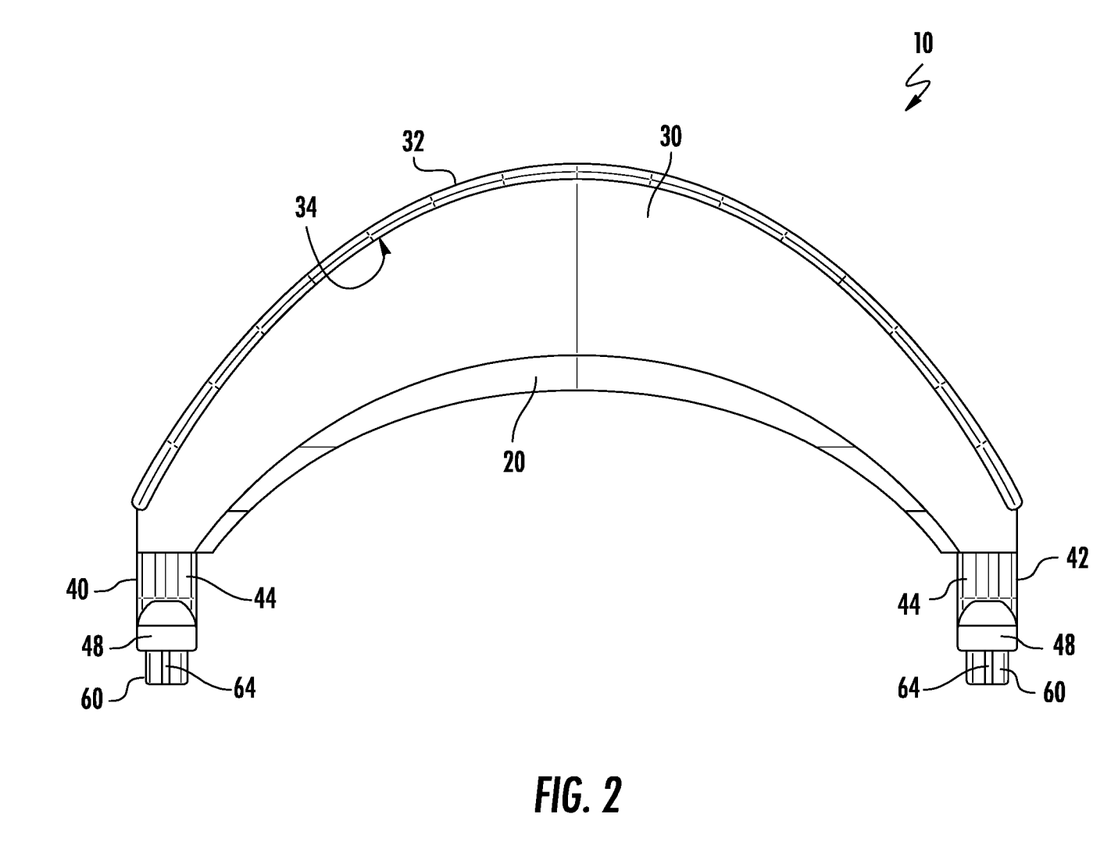
FIG. 2 shows a top view of the headwear device of FIG. 1.
Figure 3:
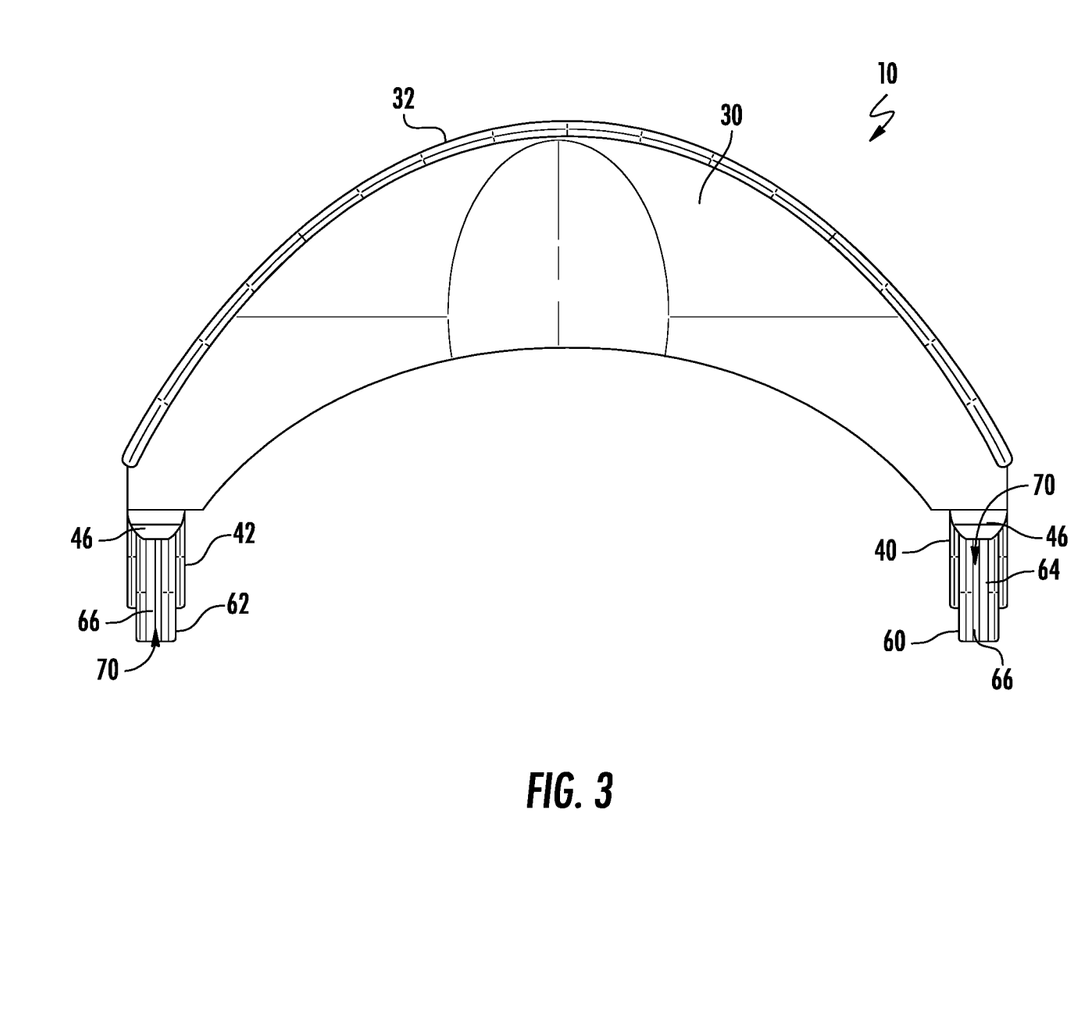
FIG. 3 shows a bottom view of the headwear device of FIG. 1.
Figure 4:
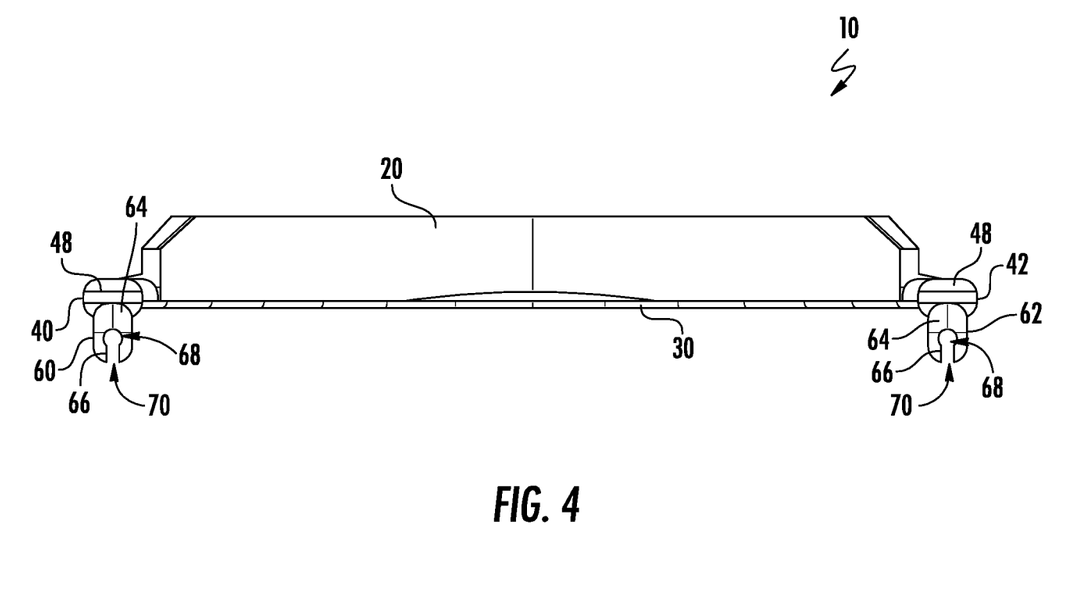
FIG. 4 shows a posterior view of the headwear device of FIG. 1.

The visor 30 provides a brim for the headwear device 10 which extends outwardly from the crown 20 in a substantially horizontal direction. In the disclosed embodiment the visor 30 extends outward between 1 and 6 inches at a front center of the crown 20, and between 0.25 and 2 inches at the lateral sides of the crown 20. As best shown in FIG. 1, the visor 30 includes a curved upper surface with the center of the visor 30 intersecting the crown at a slightly higher position than at the lateral sides of the crown. The visor also includes a front perimeter edge 32 having elongated tubular surface. Because of this, the front perimeter edge 32 of the visor 30 is rounded and smooth to the touch. A narrow channel 34 is formed between this front perimeter edge 32 and the curved upper surface of the visor 30. The channel 34 and the front perimeter edge 32 terminate at a lateral side of the visor, thus directing any moisture that collects on the upper surface of the visor 30 to the lateral side of the headwear device 10 and away from the face of the wearer.

The two temple extension members 40, 42 extend rearwardly from the lateral portions of the visor 30. Each temple extension member 40, 42 includes a cylindrical member 44 including an anterior lower bevel 46 and a posterior upper bevel 48. Each cylindrical member 44 is substantially solid with a generally oval or circular cross-sectional shape. The cylindrical member 44 is connected to the visor 30 and extends in a posterior direction from the visor 30. The anterior lower bevel 46 is integral with a lower surface of the visor 30. Accordingly, the lower surface of the visor 30 feeds directly into the anterior lower bevel. The surface of the anterior lower bevel 46 is generally angled between 30° and 60° relative to a vertical centerline extending through the center of the crown 20. The anterior lower bevel 46 extends between the lower surface of the visor 30 and an anterior end of one of the two clips 60, 62. The surface of the posterior upper bevel 48 has a substantially similar angle to that of the anterior lower bevel 46. The posterior upper bevel 48 extends to an upper middle surface of the one of the two clips 60, 62.

Each of the two clips 60, 62 includes a cylindrical portion 64 defining an axial recess 66 that is designed and dimensioned to receive a temple of a set of eyeglasses 90 (e.g., see FIG. 5) on which the headwear device 10 is mounted. Each cylindrical portion 64 includes a medial wall and a lateral wall provided on opposite sides of the axial recess 66. An outer surface of the cylindrical portion 64 is defined along the outside of the medial wall and the lateral wall. The outer surface extends to the top of the cylindrical portion 64 where one of the temple extension members 40, 42 is connected to the cylindrical portion 64. As noted previously, the posterior upper bevel 48 extends to a middle position on an upper side of the outer surface of the cylindrical portion 64. The axial recess 66 is defined on the interior of the cylindrical portion 64. The axial recess includes 66 a center cavity 68 that is enlarged relative to an axial bottom passage 70 that leads to the center cavity 68. The center cavity 68 is sufficiently large to receive most temples of standard adult eyeglasses. The medial wall and the lateral walls of the cylindrical portion 64 are resiliently flexible relative to one another. Accordingly, at least one of the medial and the lateral walls are configured to flex, thus allowing the axial bottom passage 70 to the center cavity 68 to increase and decrease in size. This allows the clips 60, 62 to receive eyeglass temples of varying sizes into the center cavities 68 of the clips 60, 62, with the medial and lateral walls of the cylindrical portion clamping onto each eyeglass temple.

Figure 5:
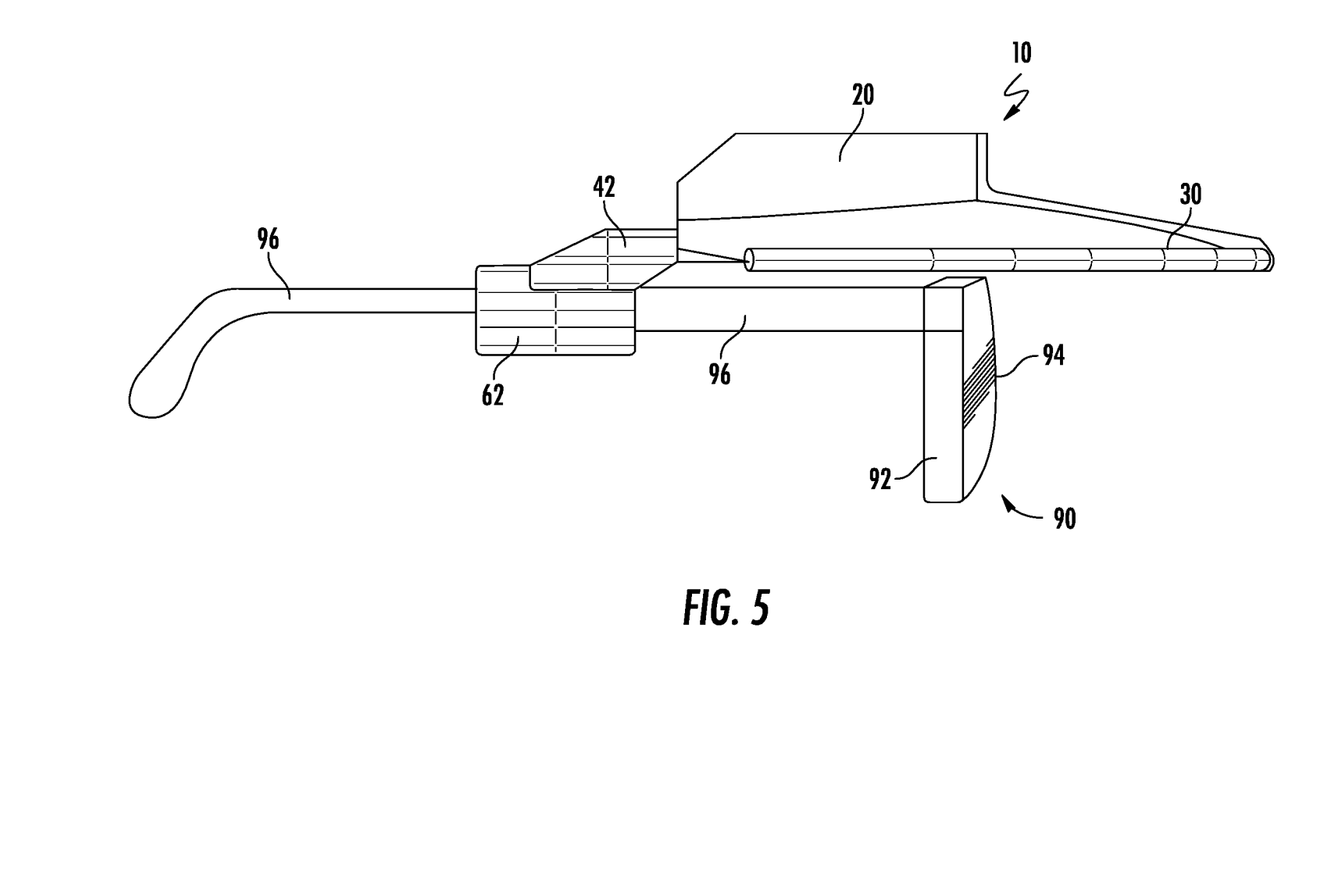
FIG. 5 shows a right side view of the headwear device of FIG. 1 positioned on eyeglasses.

With particular reference now to FIG. 5, the headwear device 10 is shown mounted on a set of eyeglasses 90. The eyeglasses include rims 92 that retain a set of lenses 94. Temples 96 extend rearwardly from the rims 92. Together the rims 92 and the temples 96 provide frames for the eyeglasses 90. As noted previously, the temples 96 are received in the clips 60, 62 of the headwear device 10. The temple extension members 40, 42 extend upward from the clips 60, 62 and place the visor 30 on a level such that the bottom surface of the visor 30 can rest against the upper surface of the rims 92 of the eyeglasses 90. This combination of the clips 60, 62 engaging the temples 96 of the eyeglasses and the visor 30 resting on the rims 92 supports the headwear device 10 and secures it in place on the eyeglasses 90. The crown 20 of the headwear device 10 is configured to rest generally above the rims 92 such that a forehead of the wearer abuts the curved interior surface of the crown 20.

Embodiment with Releasable Clip

FIGS. 6-9 illustrate a headwear device 100 that is used in place of the headwear device 10 of the embodiment of FIGS.

1-5. Similarly to the headwear device 10, the headwear device 100 is configured for use with eyeglasses having rims and two temples extending in a posterior direction from the rims. The headwear device 100 includes a crown 120 extending upwardly from a visor 130. Two first coupling members 140 extend from the visor 130, and two second coupling members 160 are configured to releasably engage the first coupling members 140. Each of the second coupling members are configured to receive one of the temples of the eyeglasses.

The crown 120, the visor 130, and the first coupling members 140 are provided as a unitary piece 110, similar to the headwear device 10, with each component connected to another component such that no one component can be removed from another component without destruction of the unitary piece 110. The second coupling members 160 are provided as separately formed pieces such that they are capable of being arranged on the temple of the eyeglasses independent of the unitary piece 110. For example, the second coupling members 160 may be connected to the temple of the eyeglasses before the unitary piece 110 is coupled to the second coupling member 160 or otherwise connected to the eyeglasses.

The headwear device 100 may be formed similarly to the headwear device 10. The unitary piece 110 may be integrally formed using a molding process, such as injection molding or compression molding. In other embodiments, different processes such as 3D printing process or other manufacturing process may be used. The second coupling member 160 may also be formed using these processes. Any of various materials described with regard to the headwear device 10 may be used to form the headwear device 100, including lightweight and low-density polymer materials. In various embodiments the polymer may be provided in any of various forms that offer structural stability yet light weight, such as foam materials, cellular materials, metal materials or composite materials.

Figure 6:
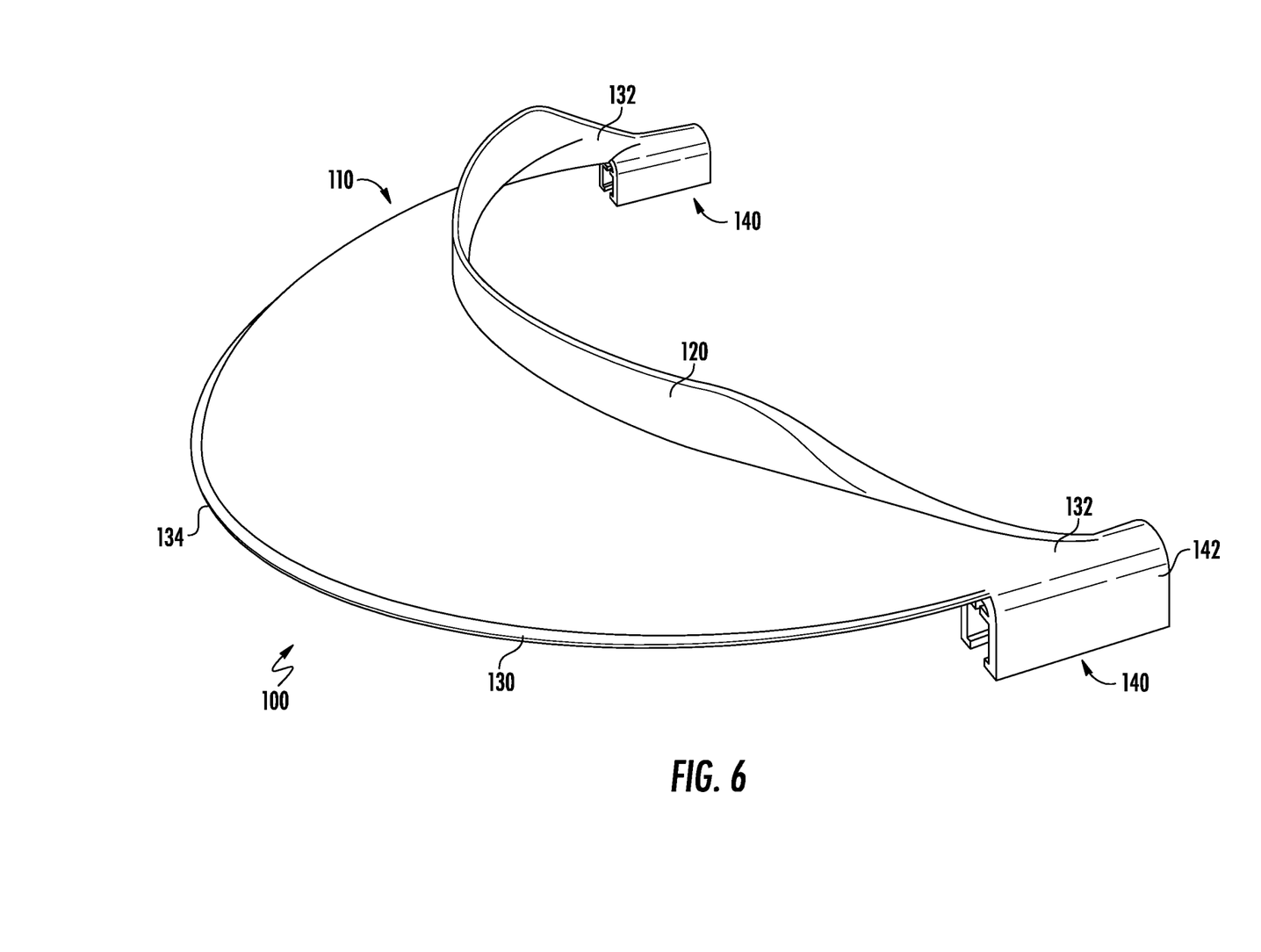
FIG. 6 shows a perspective view of an embodiment of a headwear device.

The crown 120 of the headwear device 100 is provided by a front panel that extends in an upward direction from the visor 130. The crown 120 is provided as a curved wall with gradually and continuously curved interior and exterior surfaces, similar to the crown 20 of the headwear device 10. The curved interior surface is designed and dimensioned to closely abut the forehead of a majority of adult humans and also span the width of a majority of adult eyeglasses (from a right lateral edge of the rims to a left lateral edge of the rims). In at least one embodiment, the height of the crown 120 is lower than the height of the crown 20, for example, fifty (50) percent of the height of the crown 20. In another embodiment, the height of the crown 120 above the visor 130 is substantially constant with the upper contour of the visor 130. Further, as best shown in FIG. 6, the crown 120 is provided with chamfered upper lateral edges that extend from lateral edges 132 of the visor 130 towards the center of the crown 120 a greater distance than the chamfered edges of the crown 20. The reduced height and longer chamfered edges further reduce the weight of the crown 120 and therefore the overall weight of the headwear device 100. The extra chamfering also further reduces any possible interference with the hair of the wearer and any discomfort created by the crown 120 rubbing against the wearer's forehead.

The visor 130 is configured similarly to the visor 30 described in the embodiment of FIGS. 1-5. The visor 130 provides a brim for the headwear device 100 which extends outwardly from the crown 120 in a substantially horizontal direction. The visor 130 includes two lateral portions 132 located at the lateral terminal ends of the visor 130. The visor 130 includes a curved upper surface with the center of the visor 130 intersecting the crown at a slightly higher position than at the lateral sides of the crown. The visor 130 also includes a front perimeter edge 134 that terminates at the two lateral portions 132 of the visor 130.

The first coupling members 140 extend from the two lateral portions 132 of the visor 130. In the disclosed embodiment, the headwear device 100 includes two first coupling members 140 (i.e., a left first coupling member and a right first coupling member), each extending from one of the left and right lateral portions 132 of the visor 130. However, it will be appreciated that in at least some embodiments, the headwear device 100 includes only a single first coupling member extending from one side of the visor (i.e., either the left or right side), and the opposite side is free of any coupling members. Accordingly, it will be appreciated that reference to "the first coupling member 140" in the present disclosure may be used in reference to an embodiment of the headwear device 100 with a solitary first coupling member, or an embodiment with multiple first coupling members (such as the embodiments of FIGS. 6 and 7 with both left and right side first coupling members 140 provided on the headwear device 110).

Figure 7:
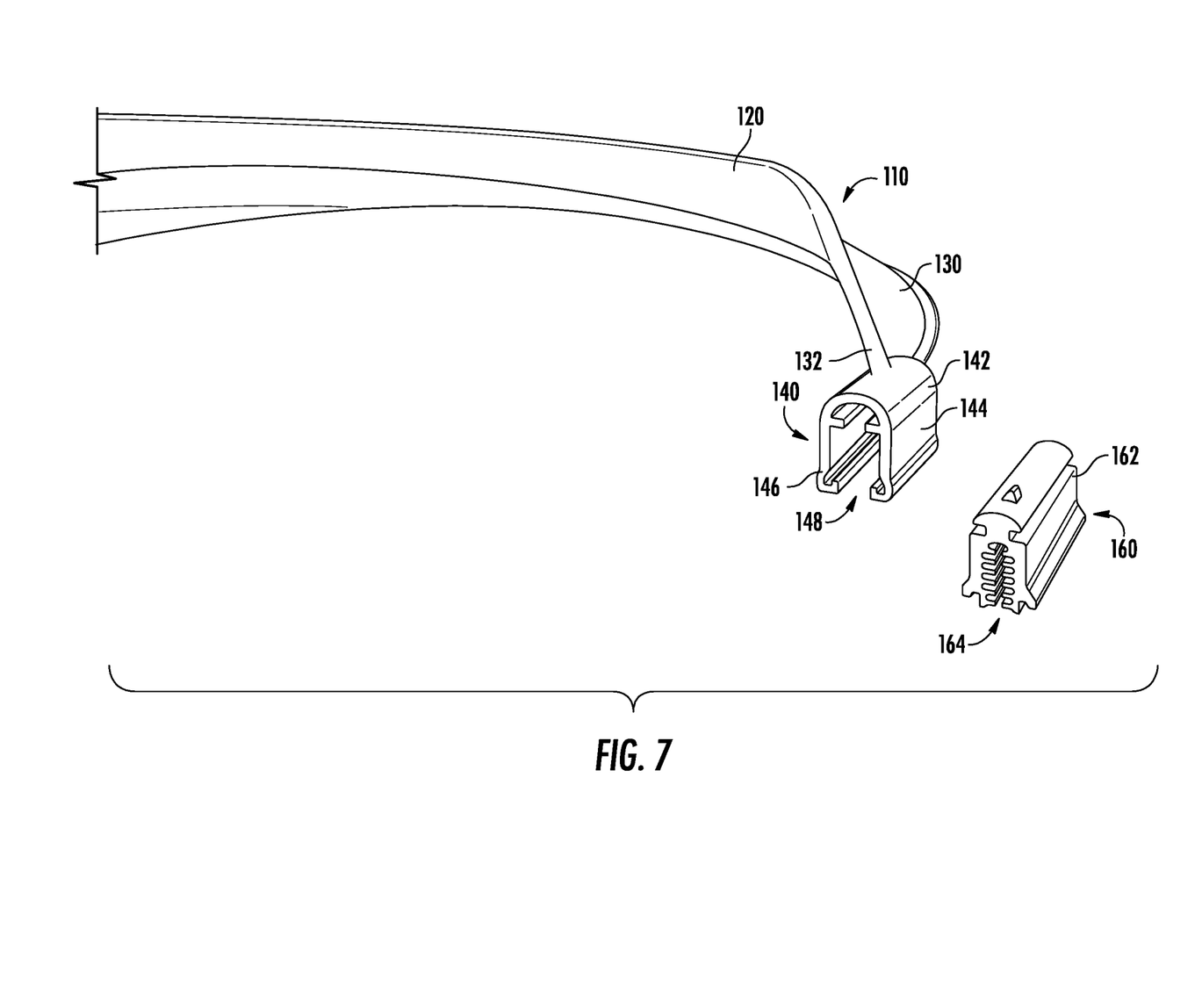
FIG. 7 shows a posterior perspective view of the headwear device of FIG. 6.

With particular reference to FIGS. 6 and 7, the first coupling member 140 may extend in a perpendicular downward direction away from the lateral portion 132, although it should be appreciated that the first coupling member 140 may extend away from the lateral portion 132 in other directions, such as upward or at an angle in order to accommodate various head types and eyeglass requirements. As can be best seen in FIG. 6, the first coupling member 140 is arranged on the underside of the lateral portion 132 of the visor at a position posterior of the terminal edge of the visor 130 such that the chamfered edge of the crown extends to a middle position on an upper side of the outer surface of the first coupling member 140. This arrangement allows for the unitary piece 110 to be attached to the eyeglasses via the second coupling member 160 at a position farther back on the temples of the eyeglasses, thus increasing the rigidity and balance of the headwear device 100 on the eyeglasses on the wearer.

In the embodiment of FIGS. 6-9, the first coupling member 140 is configured as a substantially cylindrical sleeve structure. The sleeve structure includes a cylindrical portion 142 having a generally oval or circular cross-sectional shape, however in other embodiments, the sleeve structure may include rectangular or other polygonal cross-sectional shapes. The cylindrical portion 142 defines an axial recess 148 designed and dimensioned to receive the second coupling member 160 on which the unitary piece 110 is mounted. An opening is defined at the bottom of the cylindrical portion 142 such that the axial recess 148 is exposed at the bottom of the cylindrical portion 142. The cylindrical portion 142 includes a lateral wall 144 and a medial wall 146 provided on opposite sides of the axial recess 148. The cylindrical portion further includes an upper wall 152. The upper wall 152 is arched with the lateral wall 144 and the medial wall 146 extending downwardly from opposite sides of the upper wall 152. The upper wall 152 includes an indent 156 formed on an inner surface of the upper wall 152. The indent 156 is configured to engage with a tab 176 extending from the second coupling member 160, which will be described in further detail below. The indent 156 may be configured as a recess or depression in the inner surface of the upper wall 152, or may completely extend through the upper wall 152 so as to form a hole in the upper wall 152.

In the embodiment of FIGS. 6-9, the lateral wall 144 and the medial wall 146 each include at least one first rib 150 extending across the axial length of the cylindrical portion 142 and projecting upwardly into the axial recess 148. The lateral wall 144 and the medial wall 146 further include at least one first axial groove 154 formed adjacent to the first rib 150 and along an inner surface of at least one of the lateral wall 144 and the medial wall 146. Each axial groove 154 extends across the axial length of the cylindrical portion 142. It should be appreciated that the cylindrical portion 142 may include as many ribs 150 and/or axial grooves 154 as necessary to establish a rigid and robust connection between the first coupling member 140 and the second coupling member 160. The cylindrical portion 142 includes two lips 158 provided on a bottom of the lateral wall 144 and a bottom of the medial wall 146 that create a curled shape on the bottoms of the walls 144, 146. The lips 158 are configured to engage with the second coupling member 160 to increase the strength of the connection between the first coupling member 140 and the second coupling member 160. A bottom opening to the axial recess 148 is provided between the lips 158. The forward and rearward ends of the cylindrical portion 142 are also open and provide forward and rearward openings to the axial recess 148.

With continued reference to FIGS. 6-9, the second coupling member 160 is provided as a standalone piece that is configured to engage and attach to the temples of the eyeglasses and configured to engage the first coupling member 140. The headwear device 100 is provided with the same number of second coupling member 160 as first coupling members 140. Accordingly, if the unitary piece 110 of the headwear device includes two first coupling members 140, two second coupling members 160 are also provided (i.e., one for each temple of the eyeglasses).

Figure 8:
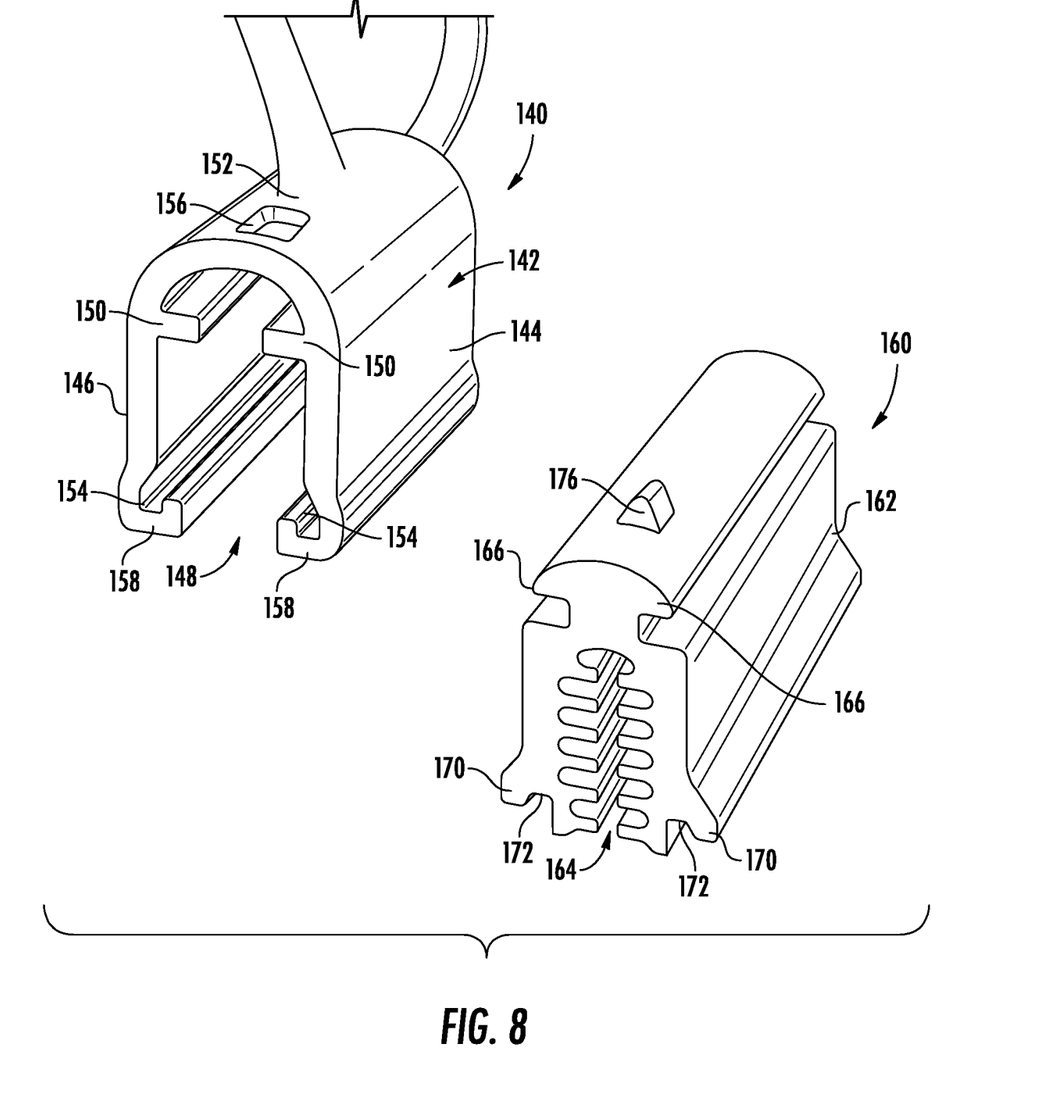
FIG. 8 shows posterior view a first coupling member and a second coupling member of the headwear device of FIG. 6.
Figure 9:
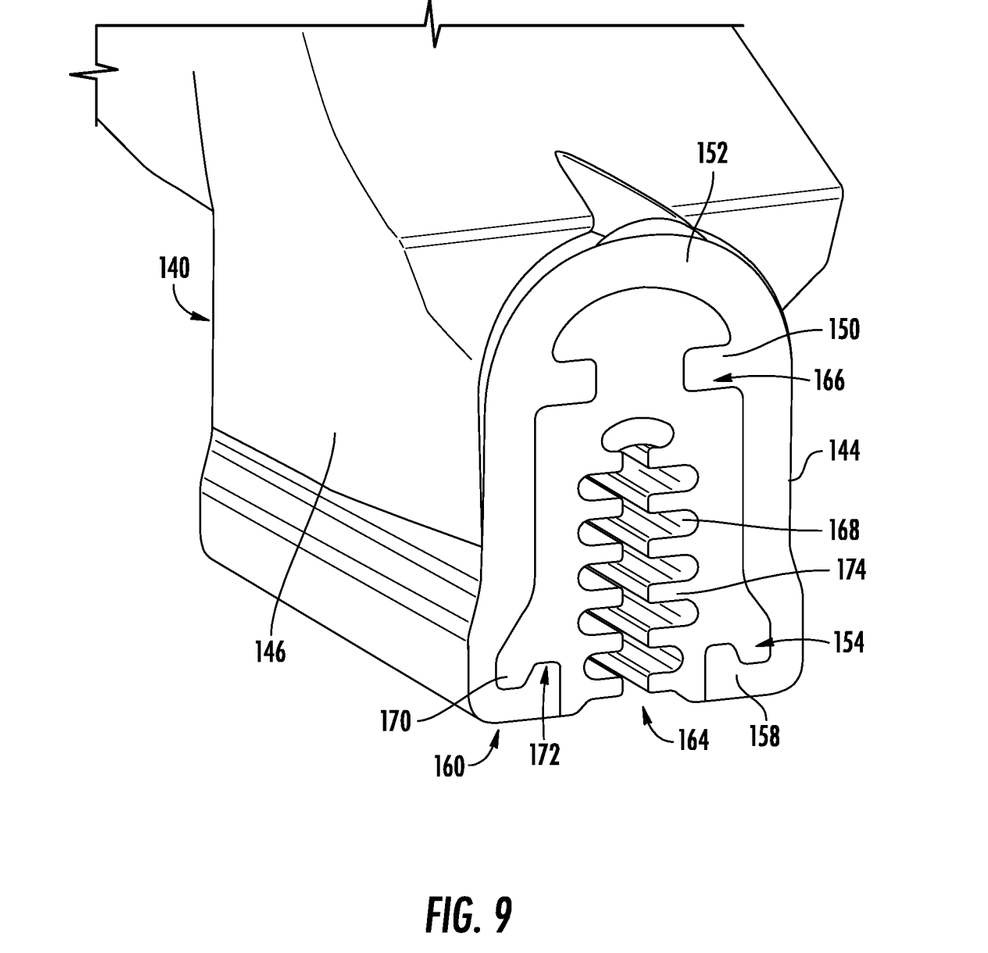
FIG. 9 shows a further posterior view of the first and second coupling members of the headwear device of FIG. 6.

As can be best seen in FIG. 8 and FIG. 9, each second coupling member 160 includes an outer surface 162 and an inner surface 168. The outer surface 162 is configured to releasably engage an inner surface of the first coupling member 140. The inner surface 168 defines an open axial channel 164 that is designed and dimensioned to receive the temple of the eyeglasses. The axial channel 164 may be formed of a resilient material such that the second coupling member 160 clips onto the temple of the eyeglasses. It should be appreciated that the axial channel 164 may couple to the temple of the eyeglasses in a variety of ways, so long as the connection is strong enough to support the unitary piece 110 on the second coupling member 160 and the eyeglasses. For example, in the embodiment of FIGS. 8 and 9, the second coupling member 160 includes a plurality of resilient ribs or teeth 174 that extend inwardly from the second surface 168 into the axial channel 164 and are configured to releasably grip the temple of the eyeglasses. The resilient ribs/teeth 174 deform when the temple of the eyeglasses is inserted into the axial channel 164 and apply a force against the temple such that the second coupling member 160 is securely coupled to the temple by a friction-fit. The resilient ribs/teeth 174 prevent the second coupling member 160, and the unitary piece 110, when attached, from being pulled away from the temples of the eyeglasses in the vertical direction until a sufficient force is applied to the second coupling member 160.

Alternatively, or in addition, the second coupling member 160 may include a tacky material on the second surface 168 that is capable of releasably holding the second coupling member 160 in place on the temple of the eyeglasses. In at least one embodiment, the second coupling member 160 may include a softer, low durometer plastic material on the second surface 168 of the axial channel 164, and a harder, more rigid plastic material towards the outer first surface 162. As a result, the axial channel 164 may be easily manipulated by the wearer in order to couple the second coupling member 160 to the temple of a variety of eyeglasses, while also providing a rigid outer surface on which the first coupling member 140 of the unitary piece 110 may be secured.

In the embodiment of FIGS. 6-9, the second coupling member 160 is configured as a substantially cylindrical shaft structure having a contour on the outer surface 162 that is similar to the contour of the inner surface that defines the axial recess 148 of the first coupling member 140. In other words, the cross-sectional shape of the outer surface 162 of the second coupling member 160 is complementary to the inner surface of the first coupling member 140. These cross-sectional shapes are consistent along an entire axial direction of both the first coupling member 140 and the second coupling member 160. As a result, the second coupling member 160 is configured to slidably engage the first coupling member 140 in the axial direction such that the wearer may easily slide the unitary piece 110 onto the second coupling member 160 disposed on the temples of the eyeglasses.

Alternatively, in at least one embodiment, the cross-sectional shape of either the first coupling member 140 or the second coupling member 160 may be interrupted at some location along the component such that the first coupling member 140 is prevented from sliding relative to the second coupling member 160 when the two components reach a full engagement position. In at least one embodiment, this full engagement position may result in locking of the first coupling member 140 relative to the second coupling member 160. For example, a tab 176 is provided on the upper outer surface 162 of the second coupling member 160 to prevent the first coupling member 140 from pulling out of engagement with the second coupling member 160 in the horizontal direction until a sufficient force is applied to the first coupling member. The tab 176 engages the indent 156 of the first coupling member 140 to lock the first coupling member 140 in place relative to the second coupling member 160 once the two components are sufficiently engaged to allow the tab 176 to click in place into the slot. The tab 176 may be formed of a deformable material, such as rubber or other soft plastics. Deformable soft materials enable the tab 176 to compress when the first coupling member 140 is slid over the second coupling member 160, and then assume its original shape when the tab 176 is aligned with the indent 156. The tab 176 may alternatively be formed as a cantilever arm, as a tab biased by a spring, or another type snapping or elastic component.

With reference again to the embodiment of FIGS. 8 and 9, the second coupling member 160 includes at least one second axial groove 166 formed in the outer first surface 162 that is configured to slidably receive the at least one first rib 150 of the first coupling member 140. The second coupling member 160 further includes at least one second rib 170 formed on and extending away from the outer first surface 162 and configured to slidably engage the at least one first axial groove 154 of the first coupling member 140. The second coupling member 160 includes as many axial grooves 164 and/or ribs 170 as are included in the first coupling member 140 such that the ribs and axial grooves each line up and engage each other and form a secure connection between the first and second coupling members 140, 160. In a further embodiment, the second coupling member 160 includes two further axial grooves 172 formed in an underside of the second coupling member 160 that are configured to slidably receive the two lips 158 of the first coupling member 140.

Alternative Embodiments

Figure 10:
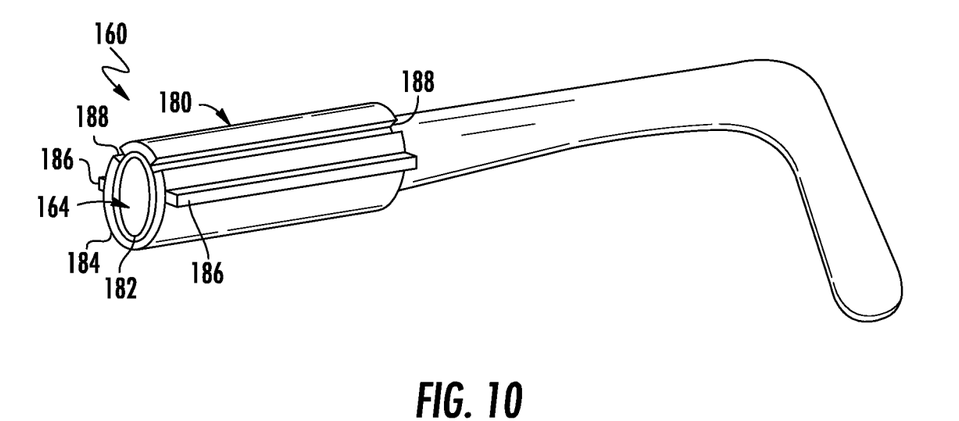
FIG. 10 shows a perspective view of another embodiment of the first and second coupling members of the headwear device of FIG. 6 positioned on a temple.

While FIGS. 1-5 and 6-9 disclose two different embodiments of the headwear device, it will be appreciated that any number of additional embodiments are contemplated. For example, in at least one further embodiment, as can be seen in FIG. 10, the second coupling member 160 may alternatively be configured as a fully-enclosed cylindrical piece 180 with openings at opposing forward and rearward ends of the cylindrical piece. The cylindrical piece 180 does not include a bottom opening such that the axial channel 164 is only open at the forward and rearward ends of the cylindrical piece. As a result, the second coupling member 160 does not clip onto the temple of the eyeglasses, but instead is slid onto the temple via the exposed end of the temple. As discussed above, the cylindrical piece 180 of the second coupling member 160 may be formed with a softer inner portion 182 and a harder outer portion 184. The softer inner portion 182 may be formed from rubber or other soft plastics such that the second coupling member 160 is flexible. The second coupling member 160 being flexible allows the headwear device 100 to be used with a wide range of eyeglasses including temples of various shapes and sizes. The cylindrical piece 180 includes at least one second rib 186 and at least one second axial groove 188 that are configured similarly to the rib 170 and the groove 166 described above. In this embodiment, the first coupling member 140 includes a cylindrical inner surface matching the outer surface of the cylindrical piece 180 such that the first coupling member 140 may slide flush over the second coupling member 160. The first rib 150 and the first axial groove 154 of the first coupling member 140 are configured to engage the second rib 186 and the second axial groove 188 of the cylindrical piece 180.

In at least one embodiment, the second coupling member 160 is dimensioned to be substantially similar to the first coupling member 140. In particular, the lateral end surfaces of the first and second coupling members 140, 160 are approximately flush with each other in order to create a balanced weight distribution of the unitary piece 110 on the eyeglasses. Furthermore, the outer first surface 162 of the second coupling member 160 may be provided with small bumps, a semi-tacky surface, or other suitable surfaces capable of lightly gripping the inner surfaces of the lateral wall 144 and the medial wall 146 of the first coupling member 140 such that the unitary piece 110 does not easily slide off of the eyeglasses when the wearer alters the position of the wearer's head or body.

Figure 11:
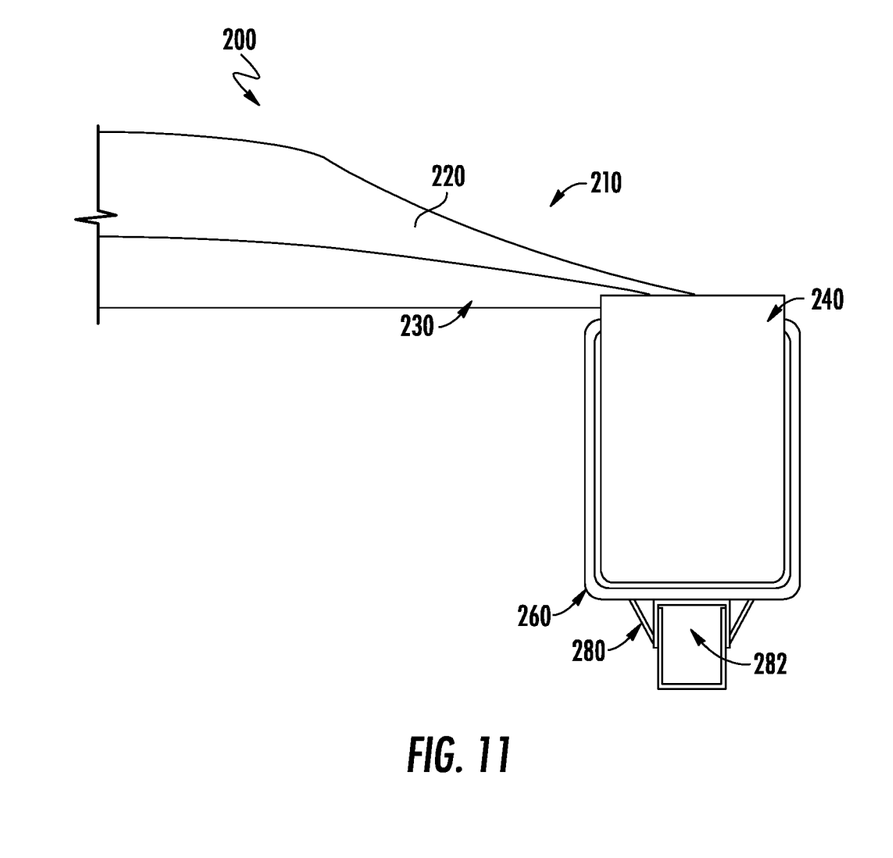
FIG. 11 shows a posterior view of another embodiment of the first and second coupling members of the headwear device of FIG. 6.

It should be appreciated that the first and second coupling members 140, 160 may be coupled to one another using a variety of methods, so long as the unitary piece 110 is able to be secured to the temples of the eyeglasses. For example, as can be seen in FIG. 11, a headwear device 200 is shown having a unitary piece 210, a crown 220, and a visor 230. The first coupling member 240 includes a shaft-like structure similar to the second coupling member 160 described above and is attached to the unitary piece 210. The second coupling member 260 includes a sleeve-like structure similar to the first coupling member 140 described above. In this case, the sleeve-like structure of the second coupling member 260 may be releasably coupled to the temple of the eyeglasses via similar methods as described above. For example, the second coupling member 260 includes a further coupling member 280 extending therefrom, the further coupling member 280 including an axial recess 282 configured to couple to the temple of the eyeglasses. The further coupling member 280 may couple to the temple via clipping onto the temple, gripping the temple, or via any of the aforementioned methods of coupling. The shaft-like structure of the first coupling member 240 releasably engages the second coupling member 260 similarly to the methods described above with regard to the first and second coupling members 140, 160. For example, the first and second coupling members 240, 260 may include a plurality of ribs and axial grooves configured to slidably engage with each other.

The first and second coupling members 140, 160, 240, 260 may be coupled together using alternative coupling methods. These may include but are not limited to Velcro, snaps, and clamps, and may or may not require ribs and/or axial grooves in the first and second coupling members 140, 160, 240, 260. As a result, the unitary piece 110, 210 may be slid or pressed onto the eyeglasses by the wearer, and the coupling may be easily carried out regardless of whether the eyeglasses are mounted or not mounted on the wearer's head.

Figure 12A:
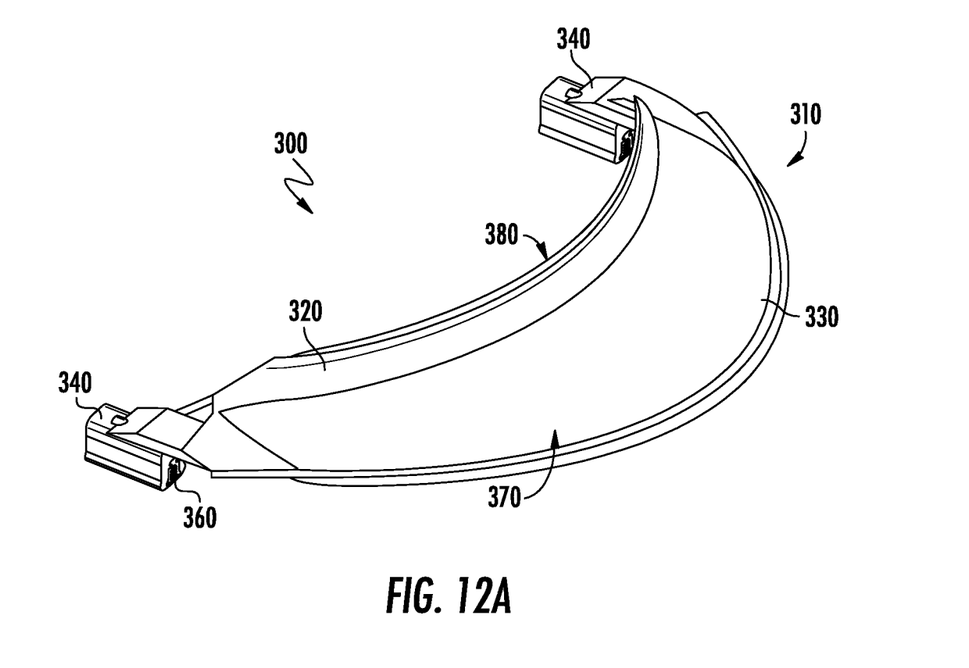
FIG. 12A shows a perspective view of an embodiment of a headwear device.
Figure 12B:
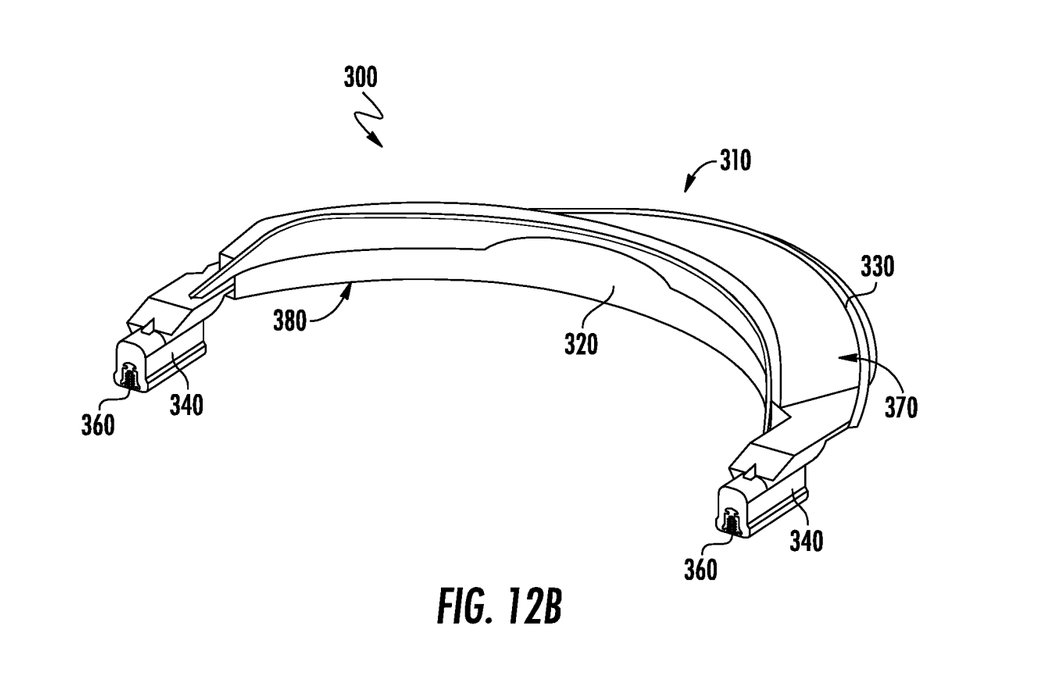
FIG. 12B shows a further perspective view of the headwear device of FIG. 12A.

It should be further appreciated that the headwear device may be formed from multiple materials. For example, in another embodiment shown in FIGS. 12A and 12B, a headwear device 300 includes a unitary piece 310, a crown 320, a visor 330, a first coupling member 340, and a second coupling member 360, all configured similarly to the corresponding components described above with regard to the headwear device 100. However, instead of being formed from a single material similar to the unitary piece 110, the unitary piece 310 is formed from two or more materials. As can be seen in FIGS. 12A and 12B, the unitary piece 310 is formed from a first material 370 and a second material 380. The first material 370, shown with the color gray in FIGS. 12A and 12B, may be a harder material, such as metal or a robust plastic that provides a stable core for the headwear device 300. The second material 380, shown with the color red in FIGS. 12A and 12B, may be a softer material, such as a soft, low durometer plastic. This configuration advantageously provides a solid core for the headwear device 300 that reinforces the unitary piece 310. This prevents damage to the headwear device 300 during transport or other situations in which the headwear device 300 may experience impact. This configuration also provides for a more aesthetic headwear device 300 if the multiple materials consist of various colors and/or textures. The headwear device 300 may also be more comfortable to wear since the harder inner material 370 may be coated with a softer outer material 380 which ultimately contacts the wearer's head.

Method of Using Headwear Device

Figure 13:
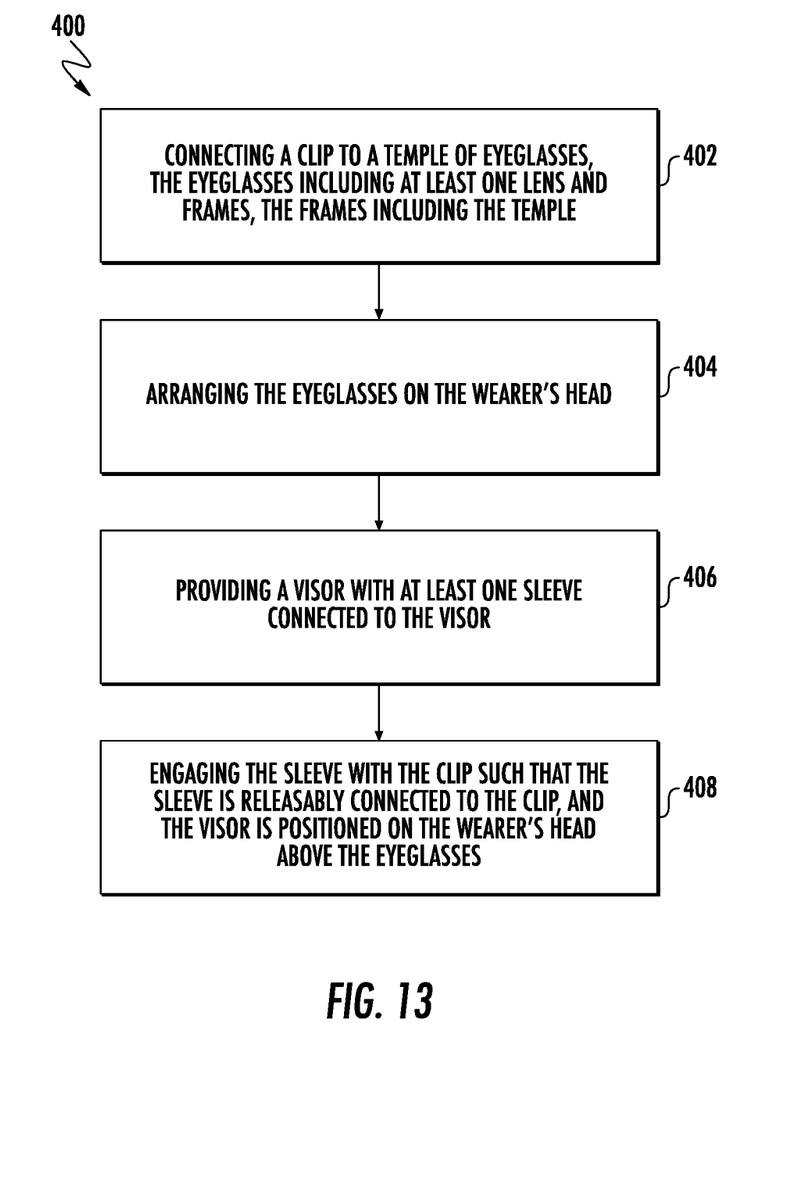
FIG. 13 shows a method of shielding a wearer's eyes using a headwear device.

A method 400 of carrying out the coupling of the headwear device 100, 200, 300 to the wearer's eyeglasses in order to shield a wearer's eyes from light is described herein. The method 400 consists of a first step 402 of connecting a clip to a temple of the eyeglasses on the wearer's head, the eyeglasses including at least one lens and frames, the frames including the temple. A second step 404 includes arranging the eyeglasses on the wearer's head. A third step 406 includes providing a visor with at least one sleeve connected to the visor. Finally, a fourth step 408 includes engaging the sleeve with the clip such that the sleeve is releasably connected to the clip, and the visor is positioned on the wearer's head above the eyeglasses.

The above-described headwear devices 10, 100, 200, 300 are configured to fit on conventional eyeglasses and effectively shield light from the eyes of a wearer in bright light situations. The headwear devices 10, 100, 200, 300 are also easy to carry, lightweight, and concealable when not in use.

Additionally, when worn, the headwear devices 10, 100, 200, 300 do not contact the hair of the wearer to a substantial degree and thus do not result in damage to the wearer's hairstyle.

The foregoing detailed description of one or more exemplary embodiments of the headwear device with visor for eyeglasses has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. A headwear device configured for use with eyeglasses including at least one lens and two eyeglass temples, the headwear device comprising:
   a visor;
   a crown;
   two temple extension members connected to opposing lateral sides of the visor; and
   two clips connected to the two temple extension members, each clip defining an axial recess, the axial recess designed and dimensioned to receive one of the two eyeglass temples.

2. The headwear device of claim 1 wherein:
   the headwear device is a monolithic component; and
   the visor, the crown, the two temple extension members, and the two clips are integrally formed from a polymer material.

3. The headwear device of claim 1 wherein the crown includes a curved interior surface designed and dimensioned to closely abut a forehead of a majority of adult humans.

4. The headwear device of claim 1 wherein a front perimeter edge of the visor includes an elongated tubular surface.

5. The headwear device of claim 1 wherein each clip defines a cylindrical portion including a medial wall and a lateral wall provided on opposite sides of the axial recess, the medial wall resiliently flexible relative to the lateral wall.

6. The headwear device of claim 5 wherein the axial recess includes a center cavity that is enlarged relative to a bottom passage to the center cavity.

7. The headwear device of claim 1 wherein each temple extension member comprises a cylindrical member including an anterior lower bevel and a posterior upper bevel.

8. The headwear device of claim 7 wherein the cylindrical member is connected to and extends in a posterior direction from the visor, and wherein the anterior lower bevel is integral with a lower surface of the visor.

9. The headwear device of claim 8 wherein the anterior lower bevel extends between the lower surface of the visor and an anterior end of one of the two clips, and wherein the posterior upper bevel extends to an upper middle surface of the one of the two clips.

10. The headwear device of claim 1 wherein the two clips are releasably connected to the two temple extension members.

11. A headwear device configured for use with eyeglasses including at least one lens and frames, the frames including a temple, the headwear device comprising:
    a visor including two lateral portions;
    a first coupling member extending from at least one of the two lateral portions; and
    a second coupling member releasably engaging the first coupling member, the second coupling member including a first surface configured to engage the first coupling member, and a second surface configured to receive the temple of the eyeglasses.

12. The headwear device of claim 11, further comprising:
    a crown connected to the visor, the crown including a curved interior surface designed and dimensioned to closely abut a forehead of a majority of adult humans.

13. The headwear device of claim 12, wherein:
    the visor, the crown, and the first coupling member are integrally formed from a polymer material; and
    the second coupling member is formed from a polymer material.

14. The headwear device of claim 11, wherein the second surface includes a plurality of teeth extending inwardly and configured to grip the temple of the eyeglasses.

15. The headwear device of claim 11, wherein the first coupling member includes a cylindrical portion defining an axial recess, the cylindrical portion having at least one first rib extending inwardly into the axial recess and at least one first axial groove formed in an inner surface of the cylindrical portion.

16. The headwear device of claim 15, wherein the second coupling member includes:
    at least one second rib extending outwardly from the first surface and configured to slidably engage with the at least one first axial groove of the cylindrical portion of the first coupling member; and
    at least one second axial groove formed in the first surface and configured to slidably engage the at least one first rib of the cylindrical portion of the first coupling member.

17. The headwear device of claim 15, wherein:
    the cylindrical portion further includes a medial wall and a lateral wall provided on opposite sides of the axial recess;
    the at least one first rib extends from an upper portion of at least one of the medial wall and the lateral wall; and
    the at least one first axial groove is formed in a lower portion of at least one of the medial wall and the lateral wall.

18. The headwear device of claim 17, wherein the cylindrical portion further includes two lips provided on a bottom of the lateral wall and a bottom of the medial wall.

19. The headwear device of claim 18, wherein:
    the second coupling member includes two further axial grooves formed in an underside of the second coupling member; and
    the two lips of each cylindrical portion are configured to slidably engage with the two further axial grooves of the second coupling member.

20. A method of shielding a wearer's eyes from light, comprising:
    connecting a clip to a temple of eyeglasses, the eyeglasses including at least one lens and frames, the frames including the temple;
    arranging the eyeglasses on a head of the wearer;

providing a visor with at least one sleeve connected to the visor; and engaging the sleeve with the clip such that the sleeve is releasably connected to the clip, and the visor is positioned on the wearer's head above the eyeglasses.

* * * * *